Patented Sept. 24, 1940

2,215,628

UNITED STATES PATENT OFFICE 2,215,628

PROCESS OF RECOVERY OF PREGNANDIOL

Paul Weil, Baltimore, Md., assignor to The Chemical Foundation, Incorporated, New York, N. Y., a corporation of Delaware No Drawing. Application March 9, 1938,
Serial No. 194,770

2 Claims. (Cl. 167—74)

From the secretions of the corpus luteum which are comprehended by the general sense of the term progestin, Marrian isolated the substance pregnandiol ($C_{21}H_{36}O_2$). This compound Butenandt employed as the starting material in the synthesis of the pure corpus luteum hormone, progesterone ($C_{21}H_{30}O_2$). (Chemistry of Natural Products Related to Phenanthrene. L. E. Fieser, 1936.)

Progesterone is a valuable therapeutic agent. However, as compared with the other known sex hormones, it is active only in relatively enormous doses. Its use has been limited in medicine by the expense of its synthesis. The richest source material contains only traces of the active therapeutic principle.

Although progesterone had been detected in the placenta, and in pregnancy urine, these sources were found comparatively impracticable and the corpora lutea from sow ovaries were preferably employed as source materials. About 625 kg. of ovaries from 50,000 sows yielded 12.5 g. of an extract which was active in doses of 3.5 to 5.5 mg. The pure progesterone isolated from this extract amounted to only 20 mg.

Pregnancy urine as a source material of progesterone has been impracticable because of the hitherto low yield obtained by existing methods of extraction, e. g., Butenandt obtained 2 g. of pregnandiol from the residues remaining from the extraction of oesterone from 1000–2000 liters of urine. With cholesterol or stigmasterol as source materials, the synthesis of progesterone requires a long series of transformations resulting in production at a market price approximating $600 per gram.

The pregnandiol present in conjugated form, as with glucuronic acid in the case of human urine, has heretofore been heated to free it from the glucuronic acid at high temperatures for a long period of time with hydrochloric acid. Such process results in the hydrolysis of the pregnandiol with a loss of at least 50 per cent. of it. My discovery that the sodium pregnandiol glucuronidate in the urine is unstable and rapidly hydrolyzes in incubated urine, permits free pregnandiol to be recovered with very slight loss.

The invention herein described relates to a process of recovery of pregnandiol from the urine of pregnancy. It has for its objects and advantages over present methods the simplification of the procedure of recovery, the lessening of the labor and shortening of the time required, and the obtaining of a high yield of pregnandiol, at a low cost.

With these and related objects in view, my invention consists essentially in the conversion of the conjugated form of pregnandiol, in which form it exists in pregnancy urine, by a novel method of hydrolysis, into the unconjugated or free form, and the recovery of the pregnandiol in free form.

An example of this method is as follows: one liter of human pregnancy urine is made alkaline (pH 8) and incubated at 37° centigrade for 48 hours. The urine may be, and preferably is, inoculated with a culture of B. Coli. The urine is then extracted with one-fifth volume of butyl alcohol. The alcohol is evaporated under reduced pressure. The residue is taken up with 50 cc. of sodium hydroxide ($\frac{1}{10}$ normal). The sodium hydroxide is then extracted with equal volume of butyl alcohol. The butyl alcohol is evaporated to dryness and the residue is taken up in 20 cc. of hot acetone. Water is then added to three volumes and this aqueous solution mixture put in the icebox overnight. A precipitate appears which is free pregnandiol. The precipitate is removed by filtration. This free pregnandiol, for purposes of purification, may be dissolved in 20 cc. of hot acetone, and three volumes of water again added and this aqueous solution mixture put in the icebox overnight, and the purified free pregnandiol allowed to precipitate for removal, as before. This precipitate, considered quantitively, varies from 14.6 mg. per liter of human urine in the first month of pregnancy to 109.2 mg. per liter of urine in the ninth month. The results of several hundred determinations show, for the urine of mid-pregnancy, a general average of 48.4 mg. per liter.

As a further example: One liter of pregnant mare's urine is made alkaline (pH 8) and incubated for one week at 37° C. It is filtered until a clear filtrate is obtained. The precipitate is dissolved in an organic solvent such as acetone or alcohol. The organic solvent is filtered and the filtrate containing the pregnandiol evaporated to dryness. The residue is dissolved in a minimum amount of acetone with gentle heating and warm NaOH (0.1 N) added to three volumes. This alkaline acetone solution is set aside in the icebox overnight. The pregnandiol settles out of solution. The pregnandiol is filtered off, dissolved in a minimum amount of acetone and NaOH (0.1 N) again added to three volumes and set aside overnight. The precipitation is again repeated with a minimum amount of acetone and twice the amount of water. In operating under this particular method it was found, in typical cases, that in the fourth month of pregnancy 40 liters of mare's urine yielded 350 mg. of free pregnandiol.

In the methods thus exampled, there is no substantial loss of pregnandiol in the step of obtaining free pregnandiol from the urine, as is the case in prior procedure for the synthesis of progesterone from pregnandiol.

As will be obvious from the foregoing specification, various changes may be made in the details discussed therein without departing from the invention or sacrificing the advantages thereof.

Having thus described the novel steps of my process, I claim:

1. The process of recovering pregnandiol from urine containing free and conjugated pregnandiol, which comprises, adjusting the urine to substantially pH 8 and incubating the solution at a temperature of substantially 37° C. for a period of time sufficient to hydrolize the conjugated pregnandiol to free pregnandiol and recovering the pregnandiol content of the solution.

2. That method of substantially quantitively recovering pregnandiol from source material containing pregnandiol in free and conjugated form which comprises adjusting the source material to slight alkalinity, subjecting the material to incubation so controlled as effectively to split off free pregnandiol from its conjugated forms and without substantial decomposition of the original free pregnandiol content; extracting the pregnandiol from the solution and purifying the pregnandiol.

PAUL WEIL.